(12) United States Patent
Zhou et al.

(10) Patent No.: US 7,684,219 B2
(45) Date of Patent: Mar. 23, 2010

(54) MULTIPLEXED DC VOLTAGE REGULATION OUTPUT CIRCUIT HAVING CONTROL CIRCUIT FOR STABILIZING OUTPUT VOLTAGES

(75) Inventors: Tong Zhou, Shenzhen (CN); Kun Le, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 220 days.

(21) Appl. No.: 11/901,364

(22) Filed: Sep. 17, 2007

(65) Prior Publication Data

US 2008/0067873 A1    Mar. 20, 2008

(30) Foreign Application Priority Data

Sep. 15, 2006    (TW)    ............................. 95134273 A

(51) Int. Cl.
  *H02H 7/125*    (2006.01)
  *G05F 1/577*    (2006.01)
(52) U.S. Cl. ........................................ 363/52; 323/267
(58) Field of Classification Search ................ 323/267, 323/268; 363/52, 81, 84, 125; 307/17, 33, 307/34, 35
See application file for complete search history.

(56) References Cited

U.S. PATENT DOCUMENTS

| 4,631,654 | A | * | 12/1986 | Houee et al. | ............. 363/21.07 |
| 6,879,499 | B2 | | 4/2005 | Matsumoto | |
| 7,170,760 | B2 | * | 1/2007 | Hsieh et al. | ................... 363/16 |

* cited by examiner

*Primary Examiner*—Gary L Laxton
(74) *Attorney, Agent, or Firm*—Wei Te Chung

(57) ABSTRACT

An exemplary multiplexed DC voltage regulation output circuit (2) comprises a first output circuit, a second output circuit, a transformer (21), a power control chip (22), a feedback circuit (20), and a control circuit (26). The first output circuit is configured for outputting low voltage. The second output circuit is configured for outputting high voltage. The transformer is configured for outputting voltages to the first output circuit and the second output circuit. The feedback circuit feeds composite signals from the first output circuit and the second output circuit back to the power control chip. The power control chip adjusts the output voltages of the transformer by changing impulse width of voltages transmitted into the transformer in accordance with the composite signals. The control circuit controls the output voltage of the second output circuit back to a normal high voltage when the output voltage is higher than normal.

14 Claims, 2 Drawing Sheets

MULTIPLEXED DC VOLTAGE REGULATION OUTPUT CIRCUIT HAVING CONTROL CIRCUIT FOR STABILIZING OUTPUT VOLTAGES

FIELD OF THE INVENTION

The present invention relates to multiplexed direct current (DC) voltage regulation output circuits, and particularly to a multiplexed DC voltage regulation output circuit with high reliability.

BACKGROUND

Multiplexed DC voltage regulation output circuits are widely used in electronic apparatuses, such as liquid crystal displays (LCDs), computers, and the like.

Referring to FIG. 2, a typical multiplexed DC voltage regulation output circuit is shown. The multiplexed DC voltage regulation output circuit 1 includes a transformer 11, a power control chip 12, a feedback circuit 10, a first output port 14, a second output port 13, a first half wave rectification circuit 15, a second half wave rectification circuit 16, a first filter circuit 17, and a second filter circuit 18.

The transformer 11 supplies low DC voltage to the first output port 14 via the first half wave rectification circuit 15 and the first filter circuit 17, and also supplies high DC voltage to the second output port 13 via the second half wave rectification circuit 16 and the second filter circuit 18. The feedback circuit 10 feeds composite signals of the first and the second output ports 14 and 13 back to the power control chip 12. The power control chip 12 adjusts the output voltage of the transformer 11 by adjusting an impulse width of the voltage transmitted from the power control chip 12 into the transformer 11 according to the composite signals.

The feedback circuit 10 includes an optical coupler 140, an adjustable precision shunt regulator 150, a first resistor 110, a second resistor 120, and a third resistor 130.

The optical coupler 140 includes a photistor 145 and a light emitting diode (LED) 141. The photistor 145 includes a floating base electrode (not labeled), an emitter electrode (not labeled) connected to the power control chip 12, and a collector electrode (not labeled) connected to a power supply via a current-limiting resistor (not labeled). The positive electrode of the LED 141 is connected through the first resistor 110 to a node between the second half wave rectification circuit 16 and the second filter circuit 18. The negative electrode of the LED 141 is connected to a negative electrode 152 of the adjustable precision shunt regulator 150.

When current flows though the LED 141, the LED 141 emits light beams on the photistor 145. The photistor 145 receives the light beams and is switched on, whereupon current flows through the photistor 145 from the collector electrode to the emitter electrode. The current flowing through the photistor 145 is proportionate to the current flowing through the LED 141.

A positive electrode 153 of the adjustable precision shunt regulator 150 is grounded. A reference electrode 151 of the adjustable precision shunt regulator 150 is connected to the first output port 14 and the second output port 13 via the third resistor 130 and the second resistor 120, respectively.

When the first output port 14 drives a small load and the second output port 13 is idle, the voltage of the first output port 14 decreases to a lower voltage, and the voltage of the second output port 13 is maintained at a constant higher voltage. Thus, a voltage of the reference electrode 151 falls to bring down the current flowing through the adjustable precision shunt regulator 150. Thereby, a current flowing through the LED 141 decreases as well. As a response, a current transmitted into the power control chip 12 via the photistor 145 decreases. In order to increase the voltage of the first output port 14, the power control chip 12 raises a duty ratio of a voltage transmitted from the power control chip 12 into the transformer 11.

However, when the transformer 11 increases the voltage of the first output port 14, the voltage of the second output port 13 is also increased from a normal high voltage to an abnormal higher voltage. The abnormal higher voltage is harmful to electric apparatuses driven by the second output port 13. Therefore the multiplexed DC voltage regulation output circuit 1 has low reliability.

Accordingly, what is needed is a multiplexed DC voltage regulation output circuit that can overcome the above-described deficiencies.

SUMMARY

In one preferred embodiment, a multiplexed DC voltage regulation output circuit comprises a first output circuit, a second output circuit, a transformer, a power control chip, a feedback circuit, and a control circuit. The first output circuit is configured for outputting low voltage. The second output circuit is configured for outputting high voltage. The transformer is configured for outputting voltages to the first output circuit and the second output circuit. The feedback circuit feeds composite signals from the first output circuit and the second output circuit back to the power control chip, the control chip adjusts the output voltages of the transformer by changing impulse width of voltages transmitted into the transformer in accordance with the composite signals. The control circuit controls the output voltage of the second output circuit back to a normal high voltage when the output voltage is higher than normal.

In an alternative embodiment, a multiplexed DC voltage regulation output circuit includes at least two output circuits, a transformer, a power control chip, a first feedback circuit, and a second feedback circuit. The at least two output circuits are configured for outputting at least one lower voltage and at least one higher voltage. The transformer is configured for outputting voltages to the output circuits. The first feedback circuit is configured for feeding composite signals of the output circuits to the power control chip, the power control chip adjusts the output voltages of the transformer by changing impulse width of voltages transmitted into the transformer in accordance with the composite signals. The second feedback circuit is configured for adjusting the higher voltage of the output circuits back to a normal high voltage when the output voltage is higher than normal.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
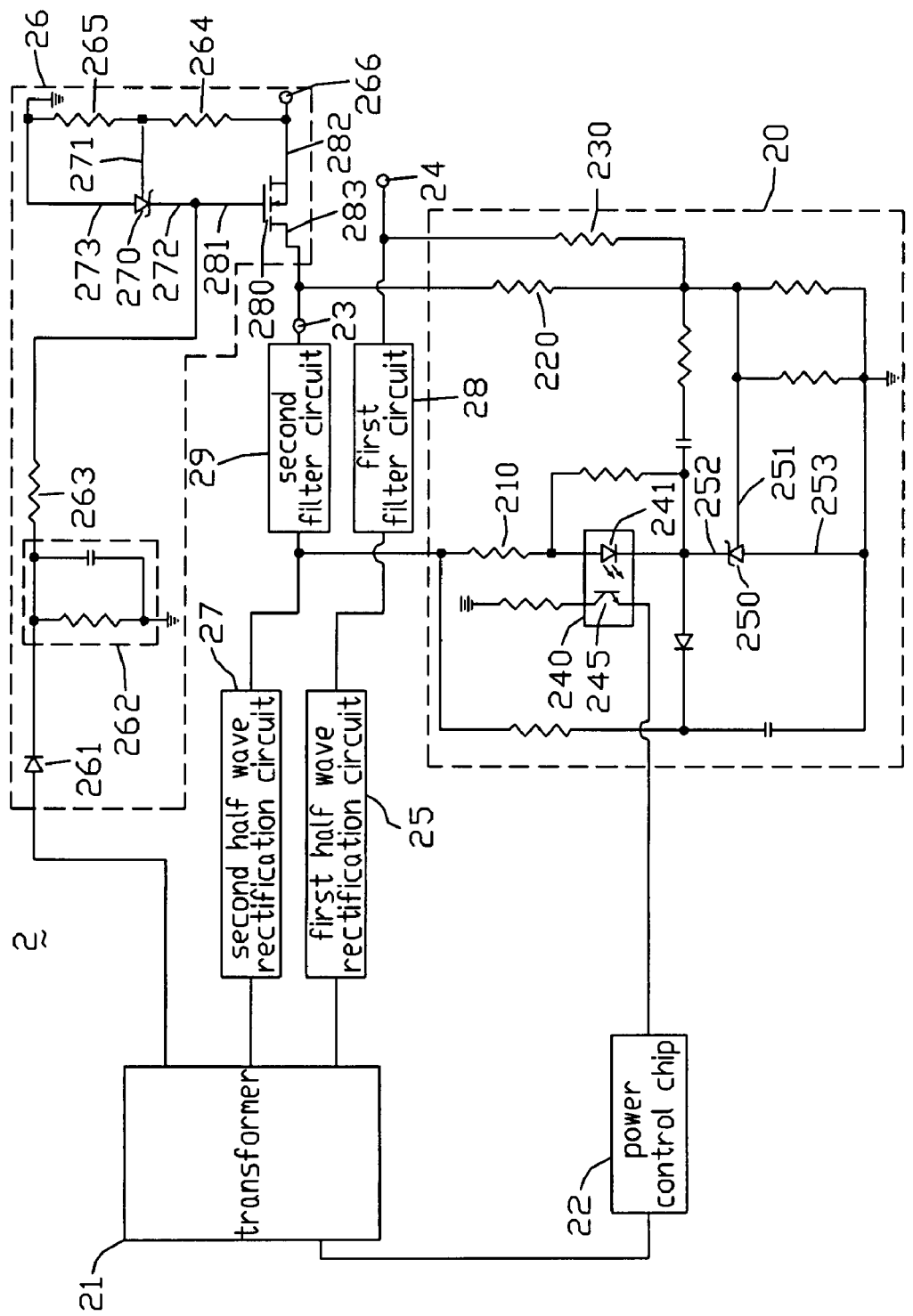
FIG. 1 is a circuit diagram of a multiplexed DC voltage regulation output circuit according to an exemplary embodiment of the present invention.
Figure 2:
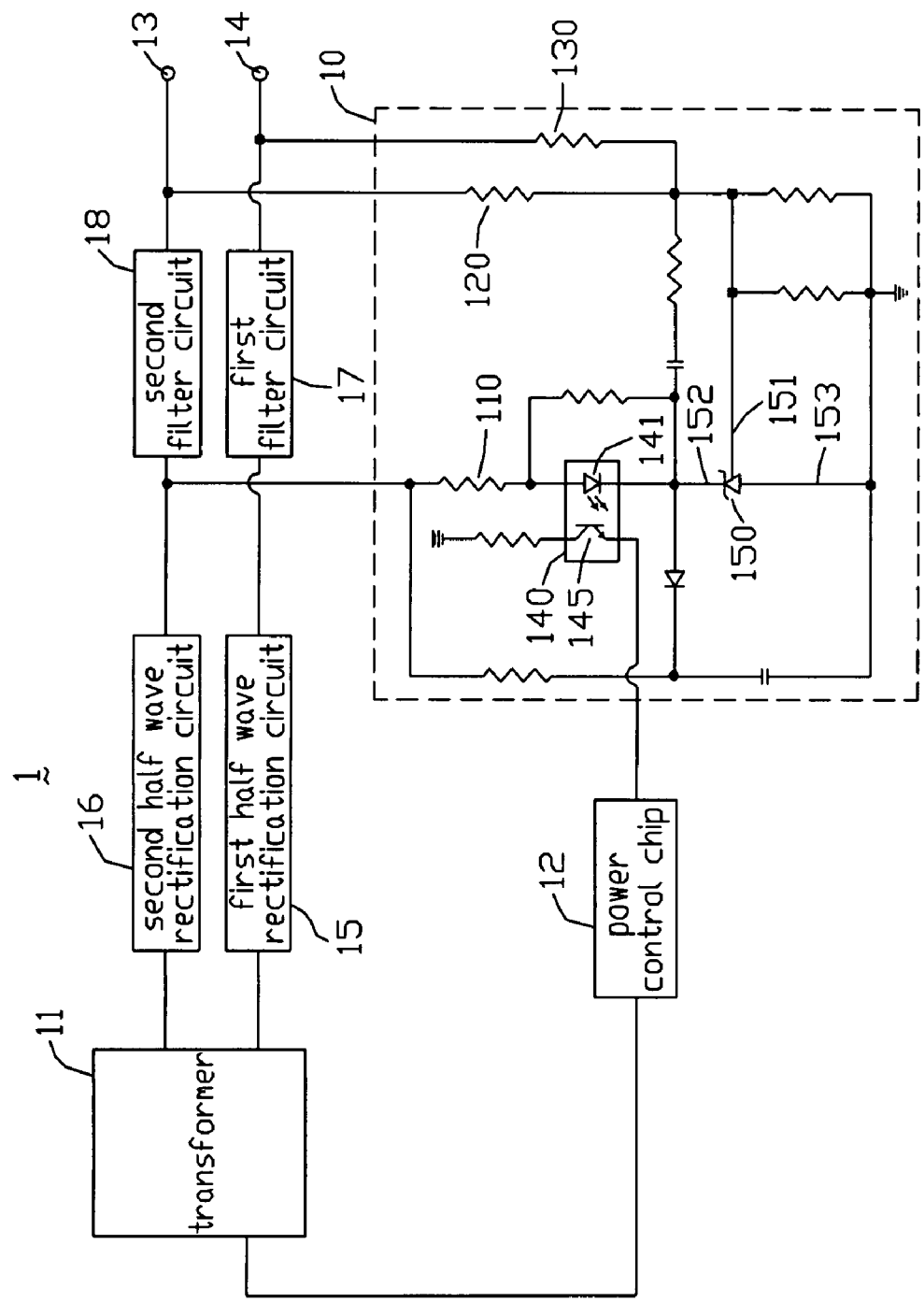
FIG. 2 is a circuit diagram of a typical multiplexed DC voltage regulation output circuit.

FIG. 1 is a diagram of a multiplexed DC voltage regulation output circuit according to an exemplary embodiment of the present invention. In FIG. 1, a dual DC voltage regulation output circuit is provided as a detailed example.

The multiplexed DC voltage regulation output circuit 2 includes a transformer 21, a power control chip 22, a control circuit 26, a feedback circuit 20, a high voltage port 23, a first output port 24, a first half wave rectification circuit 25, a second half wave rectification circuit 27, a first filter circuit 28, and a second filter circuit 29.

The transformer 21 supplies low DC voltage to the first output port 24 via the first half wave rectification circuit 25 and the first filter circuit 28, and also supplies high DC voltage to the high voltage port 23 via the second half wave rectification circuit 27 and the second filter circuit 29. The high voltage port 23 outputs high voltage into the control circuit 26. The control circuit 26 controls the high voltage output from the high voltage port 23 by adjusting its internal resistance, and outputs normal high voltages.

The feedback circuit 20 feeds composite signals of the first output port 24 and the high voltage port 23 back into the power control chip 22. The power control chip 22 adjusts the output voltage of the transformer 21 by adjusting an impulse width of a voltage transmitted from the power control chip 22 into the transformer 21 according to the composite signals.

The control circuit 26 includes a rectifier diode 261, a resistor-capacitor (RC) shunt circuit 262, a first adjustable precision shunt regulator 270, a transistor 280, a second output port 266, a first resistor 263, a second resistor 264, and a third resistor 265. The rectifier diode 261 rectifies voltage transmitted out of the transformer. The RC shunt circuit 262 smooths and filters the voltage from the rectifier diode 261. The second output port 266 outputs high voltages.

The first adjustable precision shunt regulator 270 includes a negative electrode 272, a positive electrode 273, and a reference electrode 271. The negative electrode 272 is connected to the transformer 21 sequentially via the first resistor 263 and the negative electrode (not labeled) and the positive electrode (not labeled) of the rectifier diode 261. The positive electrode 273 is grounded. The reference electrode 271 is connected to the second output port 266 via the second resistor 264, and is grounded via the third resistor 265. The first adjustable precision shunt regulator 270 can for example be a TL431 model.

The transistor 280 is an n-channel enhancement mode metal oxide semiconductor field-effect transistor (N-MOSFET). The transistor 280 includes a gate electrode 281 connected to the negative electrode 272 of the first adjustable precision shunt regulator 270, a source electrode 282 connected to the second output port 266, and a drain electrode 283 connected to the high voltage port 23. When the multiplexed DC voltage regulation output circuit 2 is working, a voltage of the gate electrode 281 is higher than a voltage of the source electrode 282, so that the transistor 280 is switched on during this time.

The RC shunt circuit 262 is electrically connected between the negative electrode of the rectifier diode 261 and ground.

The rectifier diode 261 can be a germanium diode, a silicon diode, or a gallium arsenide diode.

The feedback circuit 20 includes an optical coupler 240, a second adjustable precision shunt regulator 250, a fourth resistor 210, a fifth resistor 220, and a sixth resistor 230.

The optical coupler 240 includes a photistor 245 and a light emitting diode (LED) 241. The photistor 245 includes a floating base electrode (not labeled), an emitter electrode (not labeled) connected to the power control chip 22, and a collector electrode (not labeled) connected to a power supply via a current-limiting resistor (not labeled). The positive electrode of the LED 241 is connected to a node between the second half wave rectification circuit 27 and the second filter circuit 29. The negative electrode of the LED 241 is connected to a negative electrode 252 of the second adjustable precision shunt regulator 250.

When current flows though the LED 241, the LED emits light beams on the photistor 245. The photistor 245 receives the light beams and is switched on, whereupon current flows through the photistor 245 from the collector electrode to the emitter electrode. The current flowing through the photistor 245 is proportionate to the current flowing through the LED 241.

A positive electrode 253 of the second adjustable precision shunt regulator 250 is grounded. A reference electrode 251 of the second adjustable precision shunt regulator 250 is connected to the high voltage port 23 via the fifth resistor 220, and to the first output port 24 via the sixth resistor 230. The second adjustable precision shunt regulator 250 can for example be a TL431 model.

When the first output port 24 drives a small load and the second output port 266 is idle, the voltage of the first output port 24 decreases to a lower voltage, and the voltage of the second output port 266 is maintained at a constant higher voltage. Because the transistor 280 is switched on (see above), the voltage of the high voltage port 23 is also maintained at a constant higher voltage. Thus, a voltage of the reference electrode 251 falls to bring down a current flowing through the second adjustable precision shunt regulator 250. Thereby, a current passing through the LED 241 decreases. As a response, a current transmitted into the power control chip 22 decreases as well. In order to increase the voltages of the high voltage port 23 and the first output port 24, the power control chip 22 raises a duty ratio of a voltage transmitted from the power control chip 22 into the transformer 21. Because the transistor 280 is switched on, the voltage of the second output port 266 rises too.

Due to the rise in the voltage of the second output port 266, a voltage of the reference electrode 271 of the first adjustable precision shunt regulator 270 rises, and so current flowing through the first adjustable precision shunt regulator 270 rises. Because the current intensity of the first resistor 263 is equal to the current intensity of the first adjustable precision shunt regulator 270, the voltage of the gate electrode 281 decreases, whereupon a voltage between the gate electrode 281 and the source electrode 282 decreases. Thereby, the channel of the transistor 280 is narrowed, and an internal resistance of the transistor 280 rises. As a result, the second output port 266 outputs a lower voltage.

With the above-described configuration, the multiplexed DC voltage regulation output circuit 2 can restrain a rise in the voltage of the output port 266. Therefore the multiplexed DC voltage regulation output circuit 2 has high reliability.

In alternative embodiments, the multiplexed DC voltage regulation output circuit 2 can include more than two output ports 24, 266. In each case, the control circuit 26 can restrain the output voltage, which is otherwise liable to rise to an unacceptably high voltage, to a normal high voltage. In another example, the transistor 280 of the control circuit 26 can instead be an n-channel depletion mode metal oxide semiconductor field-effect transistor.

It is to be further understood that even though numerous characteristics and advantages of various embodiments have been set forth in the foregoing description, together with details of the structures and functions of the embodiments, the disclosure is illustrative only, and changes may be made in detail to the full extent indicated by the broad general meaning of the terms in which the appended claims are expressed.

What is claimed is:

1. A multiplexed DC voltage regulation output circuit, comprising:
   a first output circuit configured for outputting low voltage;
   a second output circuit configured for outputting high voltage;
   a transformer configured for outputting voltages to the first output circuit and the second output circuit;
   a power control chip;
   a feedback circuit configured for feeding composite signals of the first output circuit and the second output circuit to the power control chip, the power control chip configured for adjusting the output voltages of the transformer by changing an impulse width of voltages transmitted from the power control chip into the transformer in accordance with the composite signals; and
   a control circuit configured for controlling the output voltage of the second output circuit down to a normal high voltage when the output voltage of the second output circuit is higher than the normal high voltage;
   wherein the control circuit comprises:
      a first resistor;
      a second resistor;
      a third resistor;
      a diode comprising a positive electrode and a negative electrode;
      a high voltage output port for outputting high voltage;
      a first adjustable precision shunt regulator comprising a reference electrode, a negative electrode, and a positive electrode, the reference electrode connected to the high voltage output port via the second resistor and grounded via the third resistor, the negative electrode of the first adjustable precision shunt regulator connected to the transformer sequentially via the first resistor, the positive electrode of the diode, and the negative electrode of the diode, and the positive electrode of the first adjustable precision shunt regulator being grounded;
      a resistor-capacitor (RC) shunt circuit with one terminal connected to the positive electrode of the diode and the other terminal being grounded; and
      an n-channel metal oxide semiconductor field-effect transistor comprising a gate electrode connected to the positive electrode of the first adjustable precision shunt regulator, a source electrode connected to the high voltage output port, and a drain electrode connected to the output of the second output circuit.

2. The multiplexed DC voltage regulation output circuit as claimed in claim 1, wherein the diode is a rectifier diode.

3. The multiplexed DC voltage regulation output circuit as claimed in claim 1, wherein the diode is one of a germanium diode, a silicon diode, and a gallium arsenide diode.

4. The multiplexed DC voltage regulation output circuit as claimed in claim 1, wherein the first adjustable precision shunt regulator is a TL431 regulator.

5. The multiplexed DC voltage regulation output circuit as claimed in claim 1, wherein the first output circuit comprises a first half wave rectification circuit and a first filter circuit that are connected in series.

6. The multiplexed DC voltage regulation output circuit as claimed in claim 1, wherein the second output circuit comprises a second half wave rectification circuit and a second filter circuit that are connected in series.

7. The multiplexed DC voltage regulation output circuit as claimed in claim 1, wherein the feedback circuit comprises a voltage detecting circuit for detecting output voltage signals of the output circuits, and a current transformer for transforming output voltage signals into current and transmitting the current into the power control chip.

8. The multiplexed DC voltage regulation output circuit as claimed in claim 1, wherein the n-channel metal oxide semiconductor field-effect transistor of the control circuit is an n-channel enhancement mode metal oxide semiconductor field-effect transistor.

9. The multiplexed DC voltage regulation output circuit as claimed in claim 1, wherein the n-channel metal oxide semiconductor field-effect transistor of the control circuit is an n-channel depletion mode metal oxide semiconductor field-effect transistor.

10. The multiplexed DC voltage regulation output circuit as claimed in claim 1, further comprising a third output circuit configured for outputting high voltage, wherein the control circuit is further configured for controlling the output voltage of the third output circuit down to a normal high voltage when the output voltage of the third output circuit is higher than the normal high voltage.

11. A multiplexed DC voltage regulation output circuit, comprising:
    at least two output circuits configured for respectively outputting at least one lower voltage and at least one higher voltage;
    a transformer configured for outputting voltages to the output circuits;
    a power control chip;
    a first feedback circuit configured for feeding composite signals of the output circuits to the power control chip, the power control chip configured for adjusting the output voltages of the transformer by changing an impulse width of voltages transmitted from the power control chip into the transformer in accordance with the composite signals; and
    a second feedback circuit for adjusting the at least one higher voltage of the output circuits back to at least one normal high voltage when the at least one higher voltage of the output circuits is higher than the at least one normal high voltage;
    wherein the second feedback circuit comprises:
       a first resistor;
       a second resistor;
       a third resistor;
       a diode comprising a positive electrode and a negative electrode;
       a high voltage output port configured for outputting high voltage;
       a first adjustable precision shunt regulator comprising a reference electrode, a negative electrode, and a positive electrode, the reference electrode connected to the high voltage output port via the second resistor and grounded via the third resistor, the negative electrode of the first adjustable precision shunt regulator connected to the transformer sequentially via the first resistor, the positive electrode of the diode, and the negative electrode of the diode, and the positive electrode of the first adjustable precision shunt regulator being grounded; and
       an n-channel metal oxide semiconductor field-effect transistor comprising a gate electrode connected to the positive electrode of the first adjustable precision shunt regulator, a source electrode connected to the high voltage output port, and a drain electrode connected to at least one output circuit of the output circuits, said at least one output circuit of the output circuits being configured for outputting the at least one higher voltage.

12. The multiplexed DC voltage regulation output circuit as claimed in claim 11, wherein each of the output circuits comprises a half wave rectification circuit and a filter circuit that are connected in series.

13. The multiplexed DC voltage regulation output circuit as claimed in claim 11, wherein the first feedback circuit comprises a voltage detecting circuit for detecting output voltage signals of the output circuits, and a current transformer for transforming the output voltage signals into current and transmitting the current into the power control chip.

14. The multiplexed DC voltage regulation output circuit as claimed in claim 13, wherein the current transformer is an optical coupler.

* * * * *